United States Patent
Song

(10) Patent No.: US 10,120,830 B2
(45) Date of Patent: Nov. 6, 2018

(54) INTERFACE CIRCUIT FOR HIGH SPEED COMMUNICATION, AND SYSTEM INCLUDING THE SAME

(71) Applicant: SK hynix Inc., Icheon-si Gyeonggi-do (KR)

(72) Inventor: Keun Soo Song, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 245 days.

(21) Appl. No.: 14/950,158

(22) Filed: Nov. 24, 2015

(65) Prior Publication Data

US 2017/0017605 A1  Jan. 19, 2017

(30) Foreign Application Priority Data

Jul. 13, 2015 (KR) .................. 10-2015-0099090

(51) Int. Cl.
*H03K 19/003* (2006.01)
*G06F 13/42* (2006.01)
*G06F 13/40* (2006.01)

(52) U.S. Cl.
CPC ...... *G06F 13/4265* (2013.01); *G06F 13/4068* (2013.01); *Y02D 10/14* (2018.01); *Y02D 10/151* (2018.01)

(58) Field of Classification Search
CPC ............... H03K 19/005; H03K 19/003; H03K 19/0315; H03K 19/0346; H03K 19/0361; H04L 25/02; H04L 25/0264; H04L 25/0278; G06F 13/4068; G06F 13/42; G06F 13/4265

See application file for complete search history.

(56) References Cited

U.S. PATENT DOCUMENTS

| | | | | |
|---|---|---|---|---|
| 6,005,895 | A * | 12/1999 | Perino ................. | H04L 5/20 341/56 |
| 6,226,330 | B1 * | 5/2001 | Mansur ................ | H04B 3/00 375/257 |
| 6,278,740 | B1 * | 8/2001 | Nordyke .............. | H04B 3/00 327/63 |
| 6,831,924 | B1 * | 12/2004 | Cornett ................ | H04L 5/14 370/282 |
| 7,656,321 | B2 * | 2/2010 | Wang ................... | H04L 25/0272 327/71 |
| 7,999,572 | B2 * | 8/2011 | Komyo ................ | G06F 13/4072 326/58 |
| 8,502,807 | B2 | 8/2013 | Tsao et al. | |
| 9,367,495 | B1 * | 6/2016 | Forbes ................. | G06F 13/40 |
| 2003/0080774 | A1 * | 5/2003 | Funaba ................ | H03K 19/018592 326/30 |
| 2004/0022311 | A1 * | 2/2004 | Zerbe .................. | H04L 25/03038 375/229 |
| 2004/0057525 | A1 * | 3/2004 | Rajan .................. | G06F 13/4072 375/257 |

(Continued)

*Primary Examiner* — Jason M Crawford
(74) *Attorney, Agent, or Firm* — William Park & Associates Ltd.

(57) ABSTRACT

A system may include an interface circuit and a plurality of wire buses electrically coupled with one another. The interface circuit may include transmitters which change states of the plurality of wire buses to transmit a plurality of multilevel symbols. The transmitters may drive wire buses, coupled to each other, to a termination voltage level.

23 Claims, 4 Drawing Sheets

(56) References Cited

U.S. PATENT DOCUMENTS

| | | | |
|---|---|---|---|
| 2006/0099926 A1* | 5/2006 | Broyde | H04B 3/32 455/295 |
| 2008/0212709 A1* | 9/2008 | Wiley | H04L 5/20 375/286 |
| 2014/0153665 A1 | 6/2014 | Wiley et al. | |
| 2015/0381340 A1* | 12/2015 | Pandey | H04B 3/00 375/226 |

* cited by examiner

INTERFACE CIRCUIT FOR HIGH SPEED COMMUNICATION, AND SYSTEM INCLUDING THE SAME

CROSS-REFERENCES TO RELATED APPLICATION

The present application claims priority under 35 U.S.C. § 119(a) to Korean application number 10-2015-0099090, filed on Jul. 13, 2015, in the Korean Intellectual Property Office, which is incorporated herein by reference in its entirety.

BACKGROUND

1. Technical Field

Various embodiments generally relate to a communication system, and more particularly, to an interface circuit for high speed communication and a system including the same.

2. Related Art

Electronic products for personal uses, such as a personal computer, a tablet PC, a laptop computer and a smart phone, may be configured by various electronic components. Two different electronic components in the electronic products may communicate at a high speed to process a large amount of data within a short time. The electronic components may generally communicate through interface circuits. The electronic components may communicate in various schemes. For example, the electronic components may communicate with a serial communication scheme.

As the performances of electronic components are improved, necessity for a communication scheme capable of increasing bandwidth and reducing power consumption has increased. In order to meet such necessities, various new serial communication schemes are suggested in the art, and improved interface circuits for supporting the new serial communication schemes are being developed.

DETAILED DESCRIPTION

Figure 1:
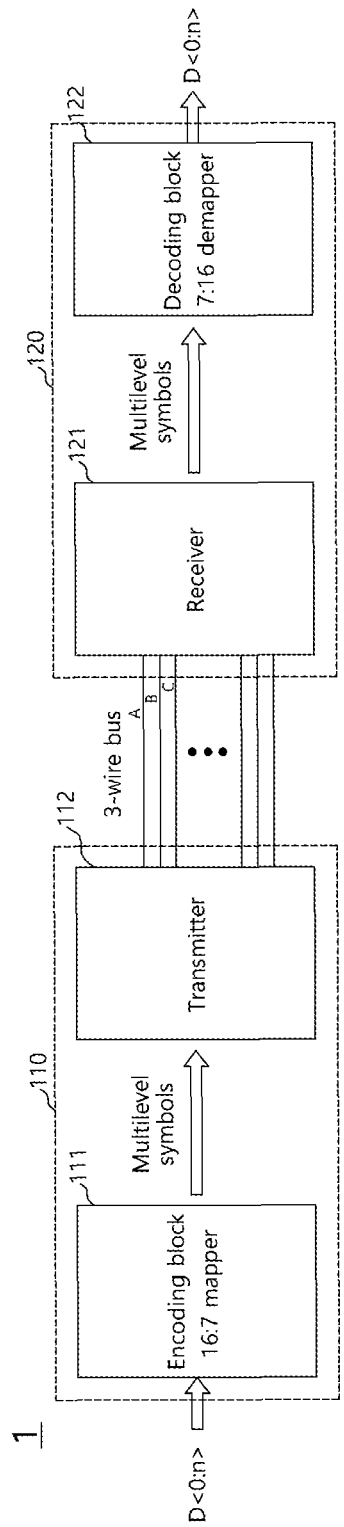
FIG. 1 is a diagram illustrating a representation of an example of the configuration of a system in accordance with an embodiment.

In an embodiment, an interface circuit may be provided The interface circuit may include a transmitter coupled with a plurality of wire buses, and may be configured to change states of the plurality of wire buses to transmit a plurality of multilevel symbols. The adjacent wire buses may be electrically coupled with each other, and the transmitter may drive the adjacent wire buses to a termination voltage level.

In an embodiment, a system may be provided. The system may include a first wire bus transmitter configured to change a state of a first wire bus based on a first multilevel symbol. The system may include a second wire bus transmitter configured to change a state of a second wire bus based on a second multilevel symbol. As the first wire bus transmitter pull-up drives at least one wire of the first wire bus and the second wire bus transmitter pull-down drives at least one wire of the second wire bus, the first and second wire buses may be driven to a termination voltage level.

In an embodiment, a system may be provided. The system may include a first wire bus transmitter configured to drive states of first to third wires to a high or low level based on a first multilevel symbol. The system may include a second wire bus transmitter configured to drive states of fourth to sixth wires to a high or low level based on a second multilevel symbol. As the first wire bus transmitter drives one of the first to third wires to a high level and the second wire bus transmitter drives one of the fourth to sixth wires to a low level, the first to sixth wires may be driven to a middle level.

In an embodiment, a system may be provided. The system may include a first wire bus transmitter configured to change a state of a first wire bus based on a first multilevel symbol, and a second wire bus transmitter configured to change a state of a second wire bus based on a second multilevel symbol. The first wire bus may include a first wire having one end coupled to a first output driver and an other end coupled to a first common node, and a second wire having one end coupled to a second output driver and an other end coupled to the first common node. The second wire bus may include a third wire having one end coupled to a third output driver and an other end coupled to a second common node, and a fourth wire having one end coupled to a fourth output driver and an other end coupled to the second common node. Each of the first, second, third, and fourth drivers include, respectively, a pull-up driver and a pull-down driver configured to drive the first second third and fourth wires, respectively, to a high or low level.

In an embodiment, an interface circuit may be provided. The interface circuit may include a transmitter coupled with a plurality of wire buses, and configured to change states of the plurality of wire buses to transmit a plurality of multilevel symbols. Wire buses may be electrically coupled with each other, and the transmitter may drive the wire buses, coupled with each other, to a termination voltage level.

Hereinafter, an interface circuit for high speed communication and a system including the same will be described below with reference to the accompanying drawings through various examples of embodiments.

Referring to FIG. 1, a system 1 in accordance with an embodiment may include a master device 110 and a slave device 120. The master device 110 may be a host device which controls the slave device 120. The master device 110 may perform a calculation operation, and may generate various control signals for controlling the slave device 120. The slave device 120 may perform various operations by being controlled by the master device 110. The master device 110 and the slave device 120 may configure one link. The master device 110 and the slave device 120 may communicate through sub links. For example, the master device 110 and the slave device 120 may include interface circuits, respectively, to communicate at a high speed. The master device 110 and the slave device 120 may be coupled through signal transmission lines, and may exchange signals through the signal transmission lines and the interface circuits.

The system 1 in accordance with the embodiment may communicate in a balanced code multilevel signal transmission scheme. The master device 110 and the slave device 120 may be coupled through a wire bus. The wire bus may include a plurality of wire groups, and each wire group may include a plurality of wires. For example, the wire bus may be a 3-wire bus, and each wire group may include 3 wires. The 3 wires of each wire group may be driven to voltage levels corresponding to a symbol to be transmitted from the master device 110 to the slave device 120 or from the slave device 120 to the master device 110. The 3 wires of each wire group may be driven to a high level, a middle level and a low level to transmit the symbol. For example, the high level may be a voltage level corresponding to ¾ V, the middle level may be a voltage level corresponding to ½ V, and the low level may be a voltage level corresponding to ¼ V. For example, the high level may be a voltage level that is higher than a middle level and a low level, the middle level may be a voltage level that is less than a high level and greater than a low level, and a low level may be a voltage level that is lower than a high level and a middle level.

Referring to FIG. 1, the master device 110 may include an encoding block 111 and a transmitter 112. The encoding block 111 and the transmitter 112 may be an interface circuit for balanced code multilevel signal transmission. The encoding block 111 may encode data D<0: n> (i.e., n may be a number) into a plurality of multilevel symbols. The encoding block 111 may be a 16:7 mapper which converts 16-bit data into 7 multilevel symbols. The transmitter 112 may receive the plurality of multilevel symbols outputted from the encoding block 111. The transmitter 112 may change the voltage levels or states of the 3-wire bus according to the multilevel symbols. The multilevel symbols may be, for example, 3-level symbols, and each symbol may include 3 phases. The 3-level symbols may include first to sixth symbols. The first to sixth symbols may be defined as +x, −x, +y, −y, +z and −z. The first symbol +x may have the phases of 1, 0, 0, the second symbol −x may have the phases of 0, 1, 1, the third symbol +y may have the phases of 0, 1, 0, the fourth symbol −y may have the phases of 1, 0, 1, the fifth symbol +z may have the phases of 0, 0, 1, and the sixth symbol −z may have the phases of 1, 1, 0. Since the transmitter 112 should change the voltage levels or states of the 3-wire bus according to the multilevel symbols, the transmitter 112 may not use a symbol which has the phases of 0, 0, 0 or 1, 1, 1.

In order to transmit the first symbol +x, the transmitter 112 may change the states of 3 wires A, B and C to the high level of ¾ V, the low level of ¼ V and the middle level of ½ V, respectively. In order to transmit the second symbol −x, the transmitter 112 may change the states of 3 wires A, B and C to the low level of ¼ V, the high level of ¾ V and the middle level of ½ V, respectively. In order to transmit the third symbol +y, the transmitter 112 may change the states of 3 wires A, B and C to the middle level of ½ V, the high level of ¾ V and the low level of ¼ V, respectively. In order to transmit the fourth symbol −y, the transmitter 112 may change the states of 3 wires A, B and C to the middle level of ½ V, the low level of ¼ V and the high level of ¾ V, respectively. In order to transmit the fifth symbol +z, the transmitter 112 may change the states of 3 wires A, B and C to the low level of ¼ V, the middle level of ½ V and the high level of ¾ V, respectively. In order to transmit the sixth symbol −z, the transmitter 112 may change the states of 3 wires A, B and C to the high level of ¾ V, the middle level of ½ V and the low level of ¼ V, respectively.

The slave device 120 may include a receiver 121 and a decoding block 122. The receiver 121 and the decoding block 122 may be an interface circuit for balanced code multilevel signal reception. The receiver 121 may be coupled with the 3-wire bus, and may receive the plurality of multilevel symbols according to the voltage levels of the 3-wire bus. While not illustrated, the receiver 121 may include 3 differential buffers in correspondence to 3 wires. The 3 differential buffers may be coupled with at least 2 of the 3 wires A, B and C. For example, a first differential buffer may output the first phase of a multilevel symbol by differentially amplifying the voltage level difference A−B of the first wire and the second wire, a second differential buffer may output the second phase of the multilevel symbol by differentially amplifying the voltage level difference B−C of the second wire and the third wire, and a third differential buffer may generate the third phase of the multilevel symbol by differentially amplifying the voltage level difference C−A of the third wire and the first wire. Therefore, the receiver 121 may output the same multilevel symbols as the multilevel symbols transmitted through the transmitter 112, according to the states or voltage levels of the 3-wire bus.

For example, in the case where the first symbol +x is transmitted, the voltage level of the first wire A may be ¾ V, the voltage level of the second wire B may be ¼ V, and the voltage level of the third wire C may be ½ V. The receiver 121 may output the first phase of the multilevel symbol as 1 by differentially amplifying the voltage level difference A−B of +½ V of the first and second wires, may output the second phase of the multilevel symbol as 0 by differentially amplifying the voltage level difference B−C of −¼ V of the second and third wires, and may output the third phase of the multilevel symbol as 0 by differentially amplifying the voltage level difference C−A of -¼ V of the third and first wires.

The decoding block 122 may decode multilevel symbols into data. The decoding block 122 may be a 7:16 demapper which decodes 7 multilevel symbols into 16-bit data. The encoding scheme of the encoding block 111 and the decoding scheme of the decoding block 122 may be complementary to each other. While FIG. 1 illustrates an example in which data are transmitted from the master device 110 to the slave device 120, it is to be noted that the embodiment is not limited to such an example. The slave device 120 may further include components such as the encoding block 111 and the transmitter 112 to transmit data to the master device 110, and the master device 110 may further include components such as the receiver 121 and the decoding block 122 to receive data from the slave device 120.

Referring to FIG. 1, the master device 110 may control the operation of the slave device 120. The master device 110 may execute an operation system and perform various calculation functions in an electronic device. For example, the master device 110 may include a processor, and the processor may include a central processing unit (CPU), a graphic processing unit (GPU), a multimedia processor (MMP) or a digital signal processor (DSP). Also, the master device 110 may be realized in the form of a system-on-chip (SoC) by combining processor chips having various functions, such as application processors.

The slave device 120 may perform various operations by being controlled by the master device 110. The slave device 120 may include all components which operate by being controlled by the master device 110. For example, the slave device 120 may include a system memory, a power controller, or a module such as a communication module, a multimedia module and an input/output module capable of performing various functions. For example, the slave device 120 may be a memory device. The memory device may include a volatile memory device such as an SRAM (static RAM), a DRAM (dynamic RAM) and an SDRAM (synchronous DRAM) or may include at least one of nonvolatile memory devices such as a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM) and an FRAM (ferroelectric RAM).

Figure 2:
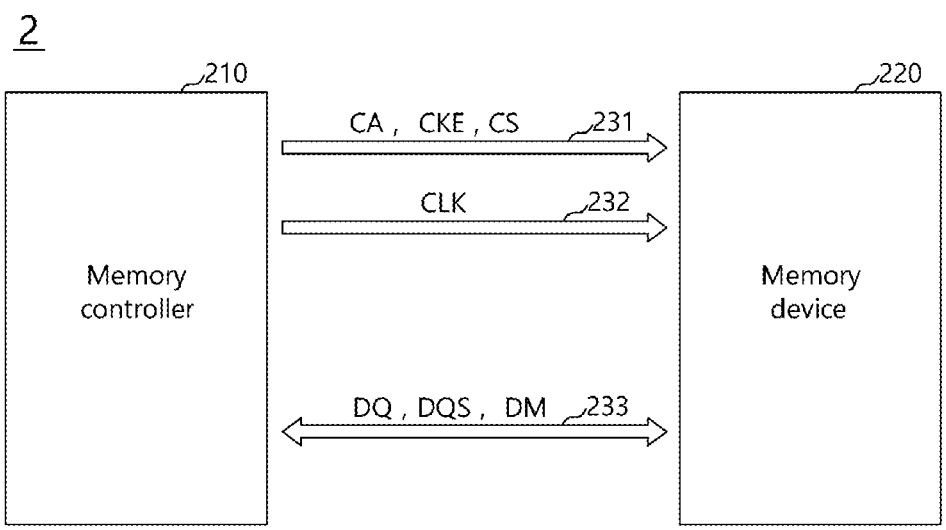
FIG. 2 is a diagram illustrating a representation of an example of the configuration of a memory system in accordance with an embodiment.

FIG. 2 is a diagram illustrating a representation of an example of the configuration of a memory system in accordance with an embodiment. Referring to FIG. 2, a memory system 2 in accordance with an embodiment may include a memory controller 210 and a memory device 220. The memory controller 210 and the memory device 220 may communicate with each other through a plurality of buses. The memory controller 210 may be a master device, and the memory device 220 may be a slave device which is controlled in its operation by the memory controller 210. The memory controller 210 may communicate with an external host device, and may provide various control signals for controlling the memory device 220, to the memory device 220. The memory controller 210 and the memory device 220 may communicate with each other in a balanced code multilevel signal transmission scheme. The memory controller 210 and the memory device 220 may transmit multilevel symbols in series. The multilevel symbols may be signals which are generated by encoding general binary data and control signals to have a plurality of levels, states or phases. For example, the multilevel symbols may be 3-level symbols.

The plurality of buses may include first to third buses 231, 232 and 233. The first bus 231 may be a command bus. The first bus 231 as a signal transmission line group for transmitting a command and an address signal CA may transmit multilevel symbols in which the command and the address signal CA, a clock enable signal CKE and a chip select signal CS are encoded. The second bus 232 may be a clock bus. The second bus 232 may be a signal transmission line group which transmits a clock CLK. The third bus 233 may be a data bus. The third bus 233 may be a signal transmission line group which transmits multilevel symbols in which a plurality of data DQ are encoded. The plurality of symbols which are transmitted through the third bus 233 may include not only information on the data DQ but also information on a data strobe signal DQS and/or a data masking signal DM. The plurality of symbols which are transmitted through the third bus 233 may be signals in which all the information on the data DQ, the data strobe signal DQS and the data masking signal DM is encoded.

The memory controller 210 and the memory device 220 may perform a write operation and a read operation. In the write and read operations, the memory controller 210 may provide to the memory device 220 the plurality of symbols which have the information on the command and address signal CA, through the first bus 231, and the clock CLK through the second bus 232. In the write operation, the memory controller 210 may provide the symbols which have the information on the data DQ and the data strobe signal DQS, to the memory device 220 through the third bus 233. In an embodiment, the memory controller 210 may include the information on the data masking signal DM in the symbols. In the read operation, the memory device 220 may provide the symbols which have the information on the data DQ and the data strobe signal DQS, to the memory controller 210 through the third bus 233.

Each memory controller 210 and memory device 220 may include a transmission interface circuit which generates symbols to be transmitted through the third bus 233 and a reception interface circuit which recovers the symbols into original data and data strobe signal. For example, the transmission interface circuit may correspond to the encoding block 111 and the transmitter 112 illustrated in FIG. 1, and the reception interface circuit may correspond to the receiver 121 and the decoding block 122 illustrated in FIG. 1.

Figure 3:
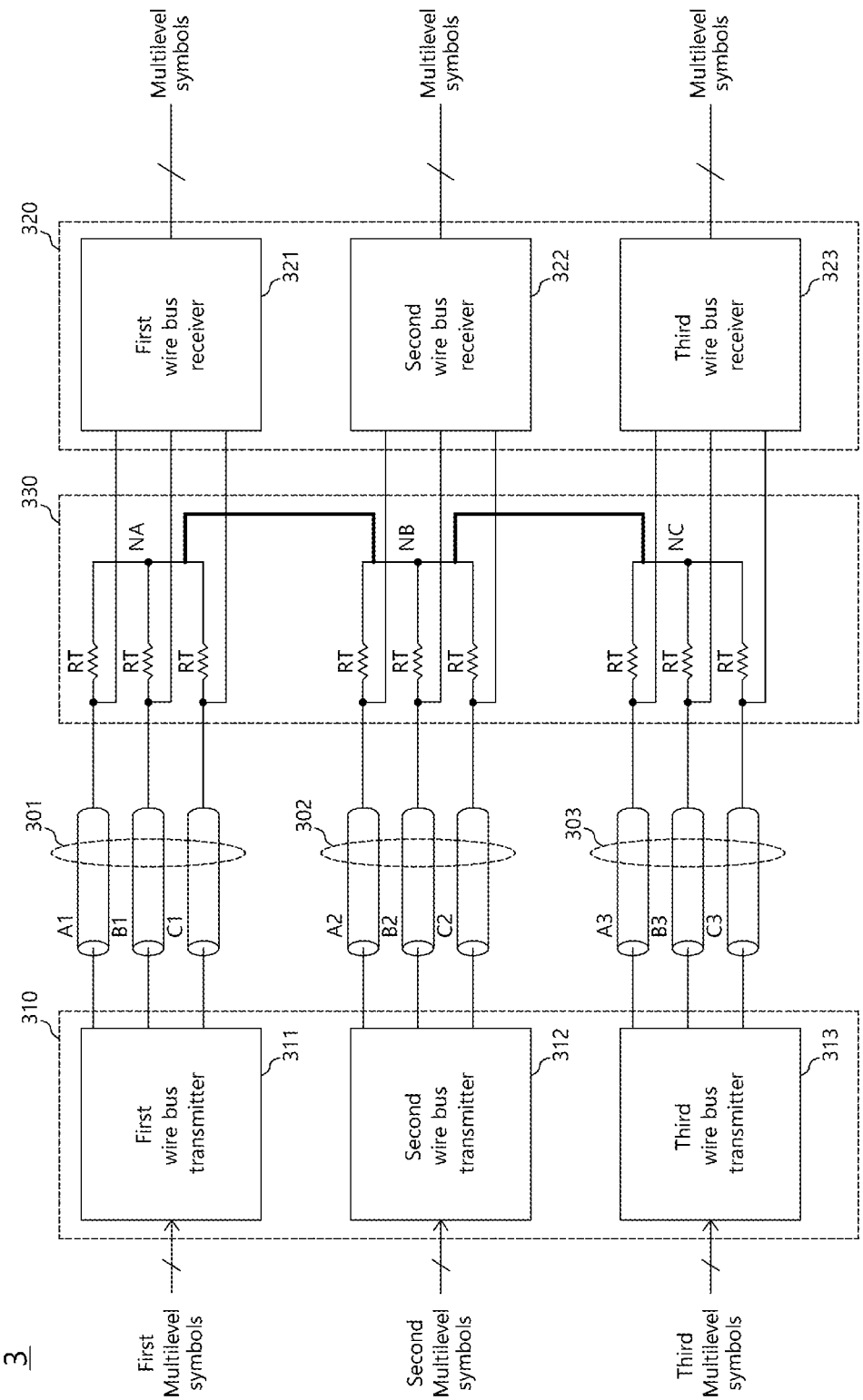
FIG. 3 is a diagram illustrating a representation of an example of the configuration of a system in accordance with an embodiment.

FIG. 3 is a diagram illustrating a representation of an example of the configuration of a system 3 in accordance with an embodiment. Referring to FIG. 3, the system 3 may include an interface circuit of a transmission device and an interface circuit of a reception device. The interface circuit of the transmission device and the interface circuit of the reception device may be coupled through a plurality of wire buses. The interface circuit of the transmission device may include a transmitter 310. The transmitter 310 may be coupled with the plurality of wire buses, and may change states of the plurality of wire buses based on a plurality of multilevel symbols to transmit the plurality of multilevel symbols to the interface circuit of the reception device. The interface circuit of the reception device may include a receiver 320. The receiver 320 may be coupled with the plurality of wire buses, and may receive the plurality of multilevel symbols based on states of the plurality of wire buses.

Adjacent 2 wire buses among the plurality of wire buses may be electrically coupled with each other. The transmitter 310 may drive adjacent 2 wire buses to a termination voltage level. When the multilevel symbols are 3-level symbols and each wire bus includes 3 wires to transmit a 3-level symbol, the 3 wires may have states of a high level, a middle level and a low level, respectively. The high level may be, for example but not limited to, a level corresponding to ¾ V, the middle level may be a level corresponding to ½ V, and the low level may be a level corresponding to ¼ V. The termination voltage level may be a level corresponding to the middle level.

The plurality of wire buses may include first to third wire buses 301, 302 and 303. While the embodiment illustrated is an example in which the system 3 includes 3 wire buses, it is to be noted that the embodiments are not limited to such an example. For example, more or less than the amount of wire buses may be used than illustrated and more or less than the amount of wires may be used than illustrated. The second wire bus 302 may be adjacent to the first wire bus 301, and the third wire bus 303 may be adjacent to the second wire bus 302. In an embodiment, adjacent wire buses may be electrically coupled with each other. For example, the first wire bus 301 and the second wire bus 302 may be coupled with each other, and the third wire bus 303 may not be coupled with the first and second wire buses 301 and 302. In an embodiment, the second wire bus 302 and the third wire bus 303 may be coupled with each other, and the first wire bus 301 may not be coupled with the second and third wire buses 302 and 303. Of course, while the first wire bus 301 and the third wire bus 303 may be coupled with each other, since the first and third wire buses 301 and 303 are not adjacent to each other, inefficiency is likely to occur in comparison with the above 2 examples.

When the first and second wire buses 301 and 302 are coupled, the transmitter 310 may drive at lease one wire of the first wire bus 301 and drive at least one wire of the second wire bus 302, and, thereby, drive the first and second wire buses 301 and 302 to the termination voltage level. The transmitter 310 may pull-up drive at lest one wire of the first wire bus 301, and pull-down drive at lest one wire of the second wire bus 302. Accordingly, the wires of the first and second wire buses 301 and 302 may be driven to the middle level. Conversely, the transmitter 310 may pull-down drive at lest one wire of the first wire bus 301, and pull-up drive at lest one wire of the second wire bus 302. In other words, in order to drive adjacent 2 wire buses to the termination voltage level, the transmitter 310 may pull-up or pull-down drive at least one wire of one wire bus and pull-down or pull-up drive at least one wire of the other wire bus adjacent to the one wire bus. In order to drive the third wire bus 303 to the termination voltage level, the transmitter 310 may drive at lest one wire of the third wire bus 303 to the middle level. Namely, the transmitter 310 may simultaneously pull-up and pull-down drive at least one wire of the third wire bus 303.

When the second and third wire buses 302 and 303 are coupled, the transmitter 310 may drive at lease one wire of the second wire bus 302 and drive at least one wire of the third wire bus 303, and, thereby, drive the second and third wire buses 302 and 303 to the termination voltage level. The transmitter 310 may pull-up drive at lest one wire of the second wire bus 302, and pull-down drive at lest one wire of the third wire bus 303. In order to drive the first wire bus 301 to the termination voltage level, the transmitter 310 may drive at lest one wire of the first wire bus 301 to the middle level.

Each of the first to third wire buses 301, 302 and 303 may include a plurality of wires. The number of wires may be changed in correspondence to a multilevel symbol. When the transmitter 310 transmits 3-level symbols, each of the first to third wire buses 301, 302 and 303 may include 3 wires. For example, the first wire bus 301 may include first to third wires A1, B1 and C1, the second wire bus 302 may include fourth to sixth wires A2, B2 and C2, and the third wire bus 303 may include seventh to ninth wires A3, B3 and C3.

Referring to FIG. 3, the transmitter 310 may include first to third wire bus transmitters 311, 312 and 313. The first wire bus transmitter 311 may be coupled with the first wire bus 301, and change a state of the first wire bus 301 based on a first multilevel symbol. The second wire bus transmitter 312 may be coupled with the second wire bus 302, and change a state of the second wire bus 302 based on a second multilevel symbol. The third wire bus transmitter 313 may be coupled with the third wire bus 303, and change a state of the third wire bus 303 based on a third multilevel symbol. The first to third wire bus transmitters 311, 312 and 313 may change states of the first to third wire buses 301, 302 and 303 to transmit the first to third multilevel symbols, respectively. When the first and second wire buses 301 and 302 are coupled, the first wire bus transmitter 311 may drive 2 wires among the first to third wires A1, B1 and C1 to a high or low level according to the first multilevel symbol, and drive the remaining 1 wire among the first to third wires A1, B1 and C1 to a high level. The second wire bus transmitter 312 may drive 2 wires among the fourth to sixth wires A2, B2 and C2 to a high or low level according to the second multilevel symbol, and drive the remaining 1 wire among the fourth to sixth wires A2, B2 and C2 to a low level. Similarly, when the second and third wire buses 302 and 303 are coupled, the second wire bus transmitter 312 may drive 2 wires among the fourth to sixth wires A2, B2 and C2 to a high or low level according to the second multilevel symbol, and drive the remaining 1 wire among the fourth to sixth wires A2, B2 and C2 to a high level. The third wire bus transmitter 313 may drive 2 wires among the seventh to ninth wires A3, B3 and C3 to a high or low level according to the third multilevel symbol, and drive the remaining 1 wire among the seventh to ninth wires A3, B3 and C3 to a low level.

The receiver 320 may include first to third wire bus receivers 321, 322 and 323. The first wire bus receiver 321 may be coupled with the first wire bus 301, and receive the first multilevel symbol transmitted from the first wire bus transmitter 311. The first wire bus receiver 321 may generate a multilevel symbol based on a state of the first wire bus 301, and the multilevel symbol may correspond to the first multilevel symbol. The second wire bus receiver 322 may be coupled with the second wire bus 302, and receive the second multilevel symbol transmitted from the second wire bus transmitter 312. The second wire bus receiver 322 may generate a multilevel symbol based on a state of the second wire bus 302, and the multilevel symbol may correspond to the second multilevel symbol. The third wire bus receiver 323 may be coupled with the third wire bus 303, and receive the third multilevel symbol transmitted from the third wire bus transmitter 313. The third wire bus receiver 323 may generate a multilevel symbol based on a state of the third wire bus 303, and the multilevel symbol may correspond to the third multilevel symbol.

The system 3 may further include a termination circuit 330. The termination circuit 330 may include a plurality of termination resistors RT. The termination circuit 330 may include termination resistors RT having one ends which are respectively coupled with the first to third wires A1, B1 and C1 and the other ends which are coupled with a first common node NA. The termination circuit 330 may include termination resistors RT having one ends which are respectively coupled with the fourth to sixth wires A2, B2 and C2 and the other ends which are coupled with a second common node NB. The termination circuit 330 may include termination resistors RT having one ends which are respectively coupled with the seventh to ninth wires A3, B3 and C3 and the other ends which are coupled with a third common node NC.

Figure 4:
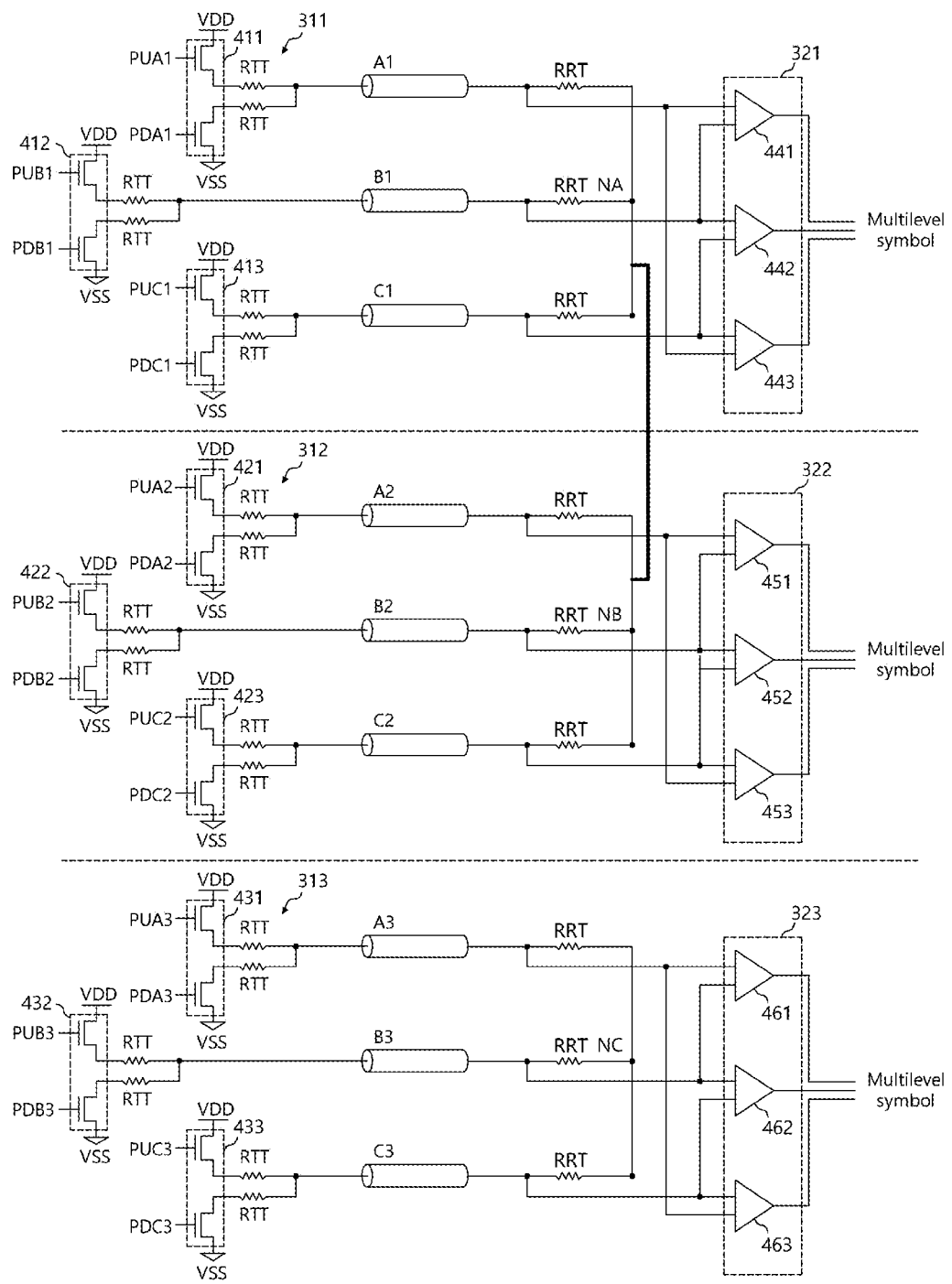
FIG. 4 is a diagram illustrating a representation of an example of the configuration of the system illustrated in FIG. 3.

FIG. 4 is a diagram illustrating a representation of an example of the configuration of the system 3 illustrated in FIG. 3. Referring to FIG. 4, the first wire bus transmitter 311 may include first to third output drivers 411, 412 and 413, the second wire bus transmitter 312 may include fourth to sixth output drivers 421, 422 and 423, and the third wire bus transmitter 313 may include seventh to ninth output drivers 431, 432 and 433. The first to ninth output drivers 411, 412, 413, 421, 422, 423, 431, 432 and 433 may be coupled with the first to ninth wires A1, B1, C1, A2, B2, C2, A3, B3 and C3, respectively, and include pull-up drivers and pull-down drivers which pull-up and pull-down drive the first to ninth wires A1, B1, C1, A2, B2, C2, A3, B3 and C3. The first to third output drivers 411, 412 and 413 may pull-up or pull-down drive the first to third wires A1, B1 and C1, respectively, in response to pull-up signals PUA1, PUB1 and PUC1 and pull-down signals PDA1, PDB1 and PDC1 which are generated based on the first multilevel symbol. The fourth to sixth output drivers 421, 422 and 423 may pull-up or pull-down drive the fourth to sixth wires A2, B2 and C2, respectively, in response to pull-up signals PUA2, PUB2 and PUC2 and pull-down signals PDA2, PDB2 and PDC2 which are generated based on the second multilevel symbol. The seventh to ninth output drivers 431, 432 and 433 may pull-up or pull-down drive the seventh to ninth wires A3, B3 and C3, respectively, in response to pull-up signals PUA3, PUB3 and PUC3 and pull-down signals PDA3, PDB3 and PDC3 which are generated based on the third multilevel symbol. While not illustrated, the system 3 may further include a controller or control circuit for providing pull-up and pull-down signals to the first to ninth output drivers 411, 412, 413, 421, 422, 423, 431, 432 and 433 based on the first to third multilevel symbols.

The first wire bus receiver 321 may include first to third reception drivers 441, 442 and 443. The first reception driver 441 may be coupled with the first and second wires A1 and B1. The first reception driver 441 may differentially amplify states of the first and second wires A1 and B1. The second reception driver 442 may be coupled with the second and third wires B1 and C1. The second reception driver 442 may differentially amplify states of the second and third wires B1 and C1. The third reception driver 443 may be coupled with the third and first wires C1 and A1. The third reception driver 443 may differentially amplify states of the third and first wires C1 and A1. Outputs of the first to third reception drivers 441, 442 and 443 may be a multilevel symbol.

The second wire bus receiver 322 may include fourth to sixth reception drivers 451, 452 and 453. The fourth reception driver 451 may be coupled with the fourth and fifth wires A2 and B2. The fourth reception driver 451 may differentially amplify states of the fourth and fifth wires A2 and B2. The fifth reception driver 452 may be coupled with the fifth and sixth wires B2 and C2. The fifth reception driver 452 may differentially amplify states of the fifth and sixth wires B2 and C2. The sixth reception driver 453 may be coupled with the sixth and fourth wires C2 and A2. The sixth reception driver 453 may differentially amplify states of the sixth and fourth wires C2 and A2. Outputs of the fourth to sixth reception drivers 451, 452 and 453 may be a multilevel symbol.

The third wire bus receiver 323 may include seventh to ninth reception drivers 461, 462 and 463. The seventh reception driver 461 may be coupled with the seventh and eighth wires A3 and B3. The seventh reception driver 461 may differentially amplify states of the seventh and eighth wires A3 and B3. The eighth reception driver 462 may be coupled with the eighth and ninth wires B3 and C3. The eighth reception driver 462 may differentially amplify states of the eighth and ninth wires B3 and C3. The ninth reception driver 463 may be coupled with the ninth and seventh wires C3 and A3. The ninth reception driver 463 may differentially amplify states of the ninth and seventh wires C3 and A3. Outputs of the seventh to ninth reception drivers 461, 462 and 463 may be a multilevel symbol.

Reception termination resistors RRT may be coupled between the first to third wires A1, B1 and C1 and the first common node NA. Reception termination resistors RRT may be coupled between the fourth to sixth wires A2, B2 and C2 and the second common node NB. Reception termination resistors RRT may be coupled between the seventh to ninth wires A3, B3 and C3 and the third common node NC. The resistance value of the reception termination resistors RRT may be R (i.e., R may be a number). Transmission termination resistors RTT may be coupled between the pull-up and pull-down drivers of the first output driver 411 and the first wire A1. Similarly, transmission termination resistors RTT may be respectively coupled between the pull-up and pull-down drivers of the second to ninth output drivers 412, 413, 421, 422, 423, 431, 432 and 433 and the second to ninth wires B1, C1, A2, B2, C2, A3, B3 and C3. The resistance value of the transmission termination resistors RTT may be R (i.e., R may be a number). However, the resistance value of certain transmission termination resistors RTT may be 2R.

In the system 3, adjacent wire buses may be coupled with each other. For example, the first to third wires A1, B1 and C1 may be coupled with the fourth to sixth wires A2, B2 and C2. The seventh to ninth wires A3, B3 and C3 may not be coupled with the first to sixth wires A1, B1, C1, A2, B2 and C2. The first to third output drivers 411, 412 and 413 may change the states of the first to third wires A1, B1 and C1 based on the first multilevel symbol, and the fourth to sixth output drivers 421, 422 and 423 may change the states of the fourth to sixth wires A2, B2 and C2 based on the second multilevel symbol. For example, it is assumed that the first multilevel symbol is the first symbol +x and the second multilevel symbol is the second symbol −x. In this example, as may be readily seen from FIG. 1, the first output driver 411 may drive the first wire A1 to the high level, the second output driver 412 may drive the second wire B1 to the low level, and the third output driver 413 may drive the third wire C1 to the middle level. The fourth output driver 421 may drive the fourth wire A2 to the low level, the fifth output driver 422 may drive the fifth wire B2 to the high level, and the sixth output driver 423 may drive the sixth wire C2 to the middle level. In the system 3 in accordance with an embodiment, the first output driver 411 may pull-up drive the first wire A1 according to the pull-up signal PUA1, and the second output driver 412 may pull-down drive the second wire B1 according to the pull-down signal PDB1. Further, the fourth output driver 421 may pull-down drive the fourth wire A2 according to the pull-down signal PDA2, and the fifth output driver 422 may pull-up drive the fifth wire B2 according to the pull-up signal PUB2. The third output driver 413 may drive the third wire C1 to the high level, and the sixth output driver 423 may drive the sixth wire C2 to the low level. That is to say, the third wire C1 may be pull-up driven as the pull-up driver of the third output driver 413 is turned on according to the pull-up signal PUC1, and the sixth wire C2 may be pull-down driven as the pull-down driver of the sixth output driver 423 is turned on according to the pull-down signal PDC2. Since the third and sixth wires C1 and C2 are coupled with each other, the third and sixth wires C1 and C2 may be driven together to the middle level. The pull-down driver of the third output driver 413 and the pull-up driver of the sixth output driver 423 may be turned off. In the conventional art, in order to drive the third wire C1 to the middle level, both the pull-up and pull-down drivers of the third output driver 413 are turned on and simultaneously pull-up and pull-down drive the third wire C1. Similarly, in order to drive the sixth wire C2 to the middle level, both the pull-up and pull-down drivers of the sixth output driver 423 are turned on and simultaneously pull-up and pull-down drive the sixth wire C2. In contrast with this, in an embodiment, since only the pull-up driver of the third output driver 413 is turned on and only the pull-down driver of the sixth output driver 423 is turned on to drive the third and sixth wires C1 and C2 to the middle level, power consumption for driving the third and sixth wires C1 and C2 to the middle level may be reduced.

In an embodiment, the resistance value of transmission termination resistors RTT coupled between the pull-up and pull-down drivers of an output driver for driving a wire to the middle level and the wire may be 2R. The resistance value of the transmission termination resistors RTT may be changed according to a multilevel symbol. The transmission termination resistors RTT may be configured by variable resistors. The resistance value of transmission termination resistors RTT coupled with an output driver for driving a wire to the high or low level according to a multilevel symbol may be controlled to R, and the resistance value of transmission termination resistors RTT coupled with an output driver for driving a wire to the middle level may be controlled to 2R. In the example where the first and second wire bus transmitters 311 and 312 transmit the first and second symbols +x and −x, respectively, as described above, the resistance value of the transmission termination resistors RTT coupled with the first output driver, the second output driver, the fourth output driver and the fifth output driver may be controlled to be R. The resistance value of the transmission termination resistors RTT coupled with the third output driver and the sixth output driver may be controlled to be 2R.

While various embodiments have been described above, it will be understood to those skilled in the art that the embodiments described are examples only. Accordingly, the interface circuit for high speed communication and the system including the same described herein should not be limited based on the described embodiments.

What is claimed is:

1. An interface circuit comprising: a transmitter coupled with a plurality of wire buses, each wire bus comprising a plurality of wires, and configured to change states of the plurality of wire buses to transmit a plurality of multilevel symbols, wherein the plurality of wires of adjacent wire buses are electrically coupled with each other, and the transmitter drives the adjacent wire buses to a termination voltage level.

2. The interface circuit according to claim 1,
   wherein the plurality of wire buses comprise first and second wire buses, and
   wherein the transmitter drives the first and second wire buses to the termination voltage level by driving at least one wire of the first wire bus and at least one wire of the second wire bus.

3. The interface circuit according to claim 2, wherein the transmitter pull-up drives the at least one wire of the first wire bus, and pull-down drives the at least one wire of the second wire bus.

4. The interface circuit according to claim 1,
   wherein the plurality of wire buses further comprise a third wire bus which is adjacent to the second wire bus, and
   wherein the transmitter drives at least one wire of the third wire bus to the termination voltage level.

5. The interface circuit according to claim 4, wherein the transmitter simultaneously pull-up and pull-down drives the at least one wire of the third wire bus.

6. A system comprising:
   a first wire bus transmitter configured to change states of a plurality of wires of a first wire bus based on a first multilevel symbol; and
   a second wire bus transmitter configured to change a states of a plurality of wires of a second wire bus based on a second multilevel symbol,
   wherein, as the first wire bus transmitter pull-up drives at least one wire of the first wire bus and the second wire bus transmitter pull-down drives at least one wire of the second wire bus, the plurality of wires of the first and second wire buses are driven to a termination voltage level.

7. The system according to claim 6,
   wherein the first wire bus comprises first to third wires, and
   wherein the first wire bus transmitter comprises:
   a first output driver configured to drive the first wire to a high or low level;
   a second output driver configured to drive the second wire to a high or low level; and
   a third output driver configured to drive the third wire to a high or low level.

8. The system according to claim 7,
   wherein the second wire bus comprises fourth to sixth wires, and
   wherein the second wire bus transmitter comprises:
   a fourth output driver configured to drive the fourth wire to a high or low level;
   a fifth output driver configured to drive the fifth wire to a high or low level; and
   a sixth output driver configured to drive the sixth wire to a high or low level.

9. The system according to claim 8,
   wherein two output drivers among the first to third output drivers pull-up or pull-down drive corresponding wires based on the first multilevel symbol, and a remaining one output driver pull-up drives a corresponding wire, and
   wherein two output drivers among the fourth to sixth output drivers pull-up or pull-down drive corresponding wires based on the second multilevel symbol, and a remaining one output driver pull-down drives a corresponding wire.

10. The system according to claim 9,
    wherein each of the first to sixth output drivers comprises a pull-up driver and a pull-down driver, and
    wherein the pull-up driver of the remaining one output driver among the first to third output drivers and the pull-down driver of the remaining one output driver among the fourth to sixth output drivers are turned on and drive the first and second wire buses to the termination voltage level.

11. The system according to claim 6, further comprising:
    a first wire bus receiver configured to generate the first multilevel symbol based on a state of the first wire bus; and
    a second wire bus receiver configured to generate the second multilevel symbol based on a state of the second wire bus.

12. The system according to claim 11,
    wherein the first wire bus comprises first to third wires,
    wherein the first wire bus receiver comprises:
    a first reception driver configured to differentially amplify states of the first and second wires;
    a second reception driver configured to differentially amplify states of the second and third wires; and
    a third reception driver configured to differentially amplify states of the third and first wires, and
    wherein outputs of the first to third reception drivers correspond to the first multilevel symbol.

13. The system according to claim 12,
    wherein the second wire bus comprises fourth to sixth wires,
    wherein the second wire bus receiver comprises:
    a fourth reception driver configured to differentially amplify states of the fourth and fifth wires;
    a fifth reception driver configured to differentially amplify states of the fifth and sixth wires; and
    a sixth reception driver configured to differentially amplify states of the sixth and fourth wires, and
    wherein outputs of the fourth to sixth reception drivers correspond to the second multilevel symbol.

14. The system according to claim 6,
    wherein the first wire bus comprises first to third wires and the second wire bus comprises fourth to sixth wires, and
    wherein the system further comprises:
    termination resistors respectively coupled between the first to third wires and a common node; and termination resistors respectively coupled between the fourth to sixth wires and the common node.

15. A system comprising:
a first wire bus transmitter configured to drive states of first to third wires to a high or low level based on a first multilevel symbol; and
a second wire bus transmitter configured to drive states of fourth to sixth wires to a high or low level based on a second multilevel symbol,
wherein, as the first wire bus transmitter drives one of the first to third wires to a high level and the second wire bus transmitter drives one of the fourth to sixth wires to a low level, the first to sixth wires are driven to a middle level.

16. The system according to claim 15, wherein the first wire bus transmitter comprises:
a first output driver configured to drive the first wire to the high or low level;
a second output driver configured to drive the second wire to the high or low level; and
a third output driver configured to drive the third wire to the high or low level.

17. The system according to claim 16, wherein the second wire bus transmitter comprises:
a fourth output driver configured to drive the fourth wire to the high or low level;
a fifth output driver configured to drive the fifth wire to the high or low level; and
a sixth output driver configured to drive the sixth wire to the high or low level.

18. The system according to claim 17, wherein, as at least one of the first to third output drivers drives a corresponding wire to the high level and at least one of the fourth to sixth output drivers drives a corresponding wire to the low level, the first to sixth wires are driven to the middle level.

19. A system comprising:
a first wire bus transmitter configured to change a state of a first wire bus based on a first multilevel symbol; and
a second wire bus transmitter configured to change a state of a second wire bus based on a second multilevel symbol,
wherein the first wire bus includes:
a first wire having one end coupled to a first output driver and an other end coupled to a first common node; and
a second wire having one end coupled to a second output driver and an other end coupled to the first common node,
wherein the second wire bus includes:
a third wire having one end coupled to a third output driver and an other end coupled to a second common node; and
a fourth wire having one end coupled to a fourth output driver and an other end coupled to the second common node,
wherein each of the first, second, third, and fourth drivers include, respectively, a pull-up driver and a pull-down driver configured to drive the first second third and fourth wires, respectively, to a high or low level.

20. The system according to claim 19, wherein, when the second and fourth wires are driven to a middle level, only the pull-up driver of the second output driver is turned on and only the pull-down driver of the fourth driver is turned on.

21. The system according to claim 19,
wherein transmission termination resistors are coupled between first, second, third, and fourth output drivers and the first, second, third, and fourth wires, respectively, and
wherein reception termination resistors are respectively coupled between other ends of the first and second wires and the first common node,
wherein reception termination resistors are respectively coupled between other ends of the third and fourth wires and the second common node.

22. The system according to claim 21,
wherein a resistance value of the transmission termination resistors are changed, respectively, according to the first or second multilevel symbol.

23. The system according to claim 22,
wherein the transmission termination resistors include a variable resistor.

* * * * *